(12) United States Patent
Cormode et al.

(10) Patent No.: US 8,590,049 B2
(45) Date of Patent: Nov. 19, 2013

(54) METHOD AND APPARATUS FOR PROVIDING ANONYMIZATION OF DATA

(75) Inventors: Graham Cormode, Morristown, NJ (US); Divesh Srivastava, Summit, NJ (US); Ting Yu, Apex, NC (US); Qing Zhang, Torrance, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 497 days.

(21) Appl. No.: 12/542,173

(22) Filed: Aug. 17, 2009

(65) Prior Publication Data

US 2011/0041184 A1    Feb. 17, 2011

(51) Int. Cl.
*G06F 17/30* (2006.01)

(52) U.S. Cl.
USPC ............. 726/26; 707/756; 707/757; 707/776; 707/781; 705/2; 705/3; 705/74

(58) Field of Classification Search
USPC ................. 705/1.1; 726/26–30; 707/756–767
See application file for complete search history.

(56) References Cited

U.S. PATENT DOCUMENTS

| 5,199,083 A | 3/1993 | Takeda | |
|---|---|---|---|
| 2004/0199781 A1* | 10/2004 | Erickson et al. | 713/200 |
| 2009/0089291 A1 | 4/2009 | Daily et al. | |
| 2009/0112867 A1 | 4/2009 | Roy et al. | |
| 2009/0303237 A1* | 12/2009 | Liu et al. | 345/440 |
| 2010/0114840 A1 | 5/2010 | Srivastava et al. | |
| 2010/0268719 A1 | 10/2010 | Cormode et al. | |

OTHER PUBLICATIONS

Mining Background Knowledge for Data Anonymization—Pub 2008.*
Aggregate Query Answering on Anonymized Tables—Pub 2007.*
Zhang et. al.—Pub IEEE 2007—Aggregate Query Answering on Anoyymized Tables.*
Edman et al. IEEE 2007—Combinatorial Approach to Measuring anynomity.*

* cited by examiner

*Primary Examiner* — Jung Kim
*Assistant Examiner* — Tri Tran (57) ABSTRACT

A method and apparatus for providing an anonymization of data are disclosed. For example, the method receives a request for anonymizing, wherein the request comprises a bipartite graph for a plurality of associations or a table that encodes the plurality of associations for the bipartite graph. The method places each node in the bipartite graph in a safe group and provides an anonymized graph that encodes the plurality of associations of the bipartite graph, if a safe group for all nodes of the bipartite graph is found.

17 Claims, 8 Drawing Sheets

FIG. 1

Grouped and Relabeled Graph
201

Graph of Published Data
202

| $E^1$ | | Customer | Group | Product | Group | x-node | Group | Y-node | Group |
|---|---|---|---|---|---|---|---|---|---|
| x1 | y2 | c1 | CG1 | p1 | PG2 | x1 | CG1 | y1 | PG1 |
| x1 | y6 | c2 | CG1 | p2 | PG1 | x2 | CG1 | y2 | PG1 |
| x2 | y1 | c3 | CG2 | p3 | PG1 | x3 | CG1 | y3 | PG1 |
| x3 | y3 | c4 | CG1 | p4 | PG2 | x4 | CG2 | y4 | PG2 |
| x3 | y4 | c5 | CG2 | p5 | PG1 | x5 | CG2 | y5 | PG2 |
| x4 | y2 | c6 | CG2 | p6 | PG2 | x6 | CG2 | y6 | PG2 |
| x4 | y4 | | | | | | | | |
| x5 | y3 | | | | | | | | |
| x5 | y6 | | | | | | | | |
| x6 | y1 | | | | | | | | |
| x6 | y5 | | | | | | | | |

$E^1$  $H_V$  $H_W$  $R_V$  $R_W$

Published tables representing (3,3) grouped graph
203

FIG. 2

Structure of safe groups
301

```
Algorithm 4.1: GROUP(V, W, E, k, j ← 0)
repeat
   for u ∈ V
      do  i ← 1;
          while (∃ v ∈ VG_i, w ∈ W: (v,w) ∈ E
                 ∧ (u,w) ∈ E) ∨ |VG_i| > k+j
             do i ← i+1;
          VG_i ← VG_i ∪ u;
   j ← j+1; V ← θ; i ← 1; l ← 1;
   for i:(|VG_{i(j-1)}|>0)
      do  if |VG_{i(j-1)}| ≥ k+j
             then VG_{lj} ← VG_{i(j-1)}; l ← l+1;
          else V ← V ∪ VG_{i(j-1)};
until |V| = 0
```

Pseudocode to find safe $k$-grouping
302

300

$(t,v)$ and $(u,w)$ imply $(u,v)$
303

Safe (1,3)-grouped graph
304

METHOD AND APPARATUS FOR PROVIDING ANONYMIZATION OF DATA

The present invention relates generally to data processing and, more particularly, to a method and apparatus for providing anonymization of data, e.g., graph data, social network data, and the like.

BACKGROUND OF THE INVENTION

The recent rise in popularity of online activity, e.g., purchasing of products, has created large quantities of data about associations between entities. The data is often organized and kept in records for ease of access by multiple users or applications. When the data is organized in electronically accessible records, it is managed and updated by computers. These electronically accessible records can be stored into operational databases. Users and applications can then query these operational databases to access the data. However, the data contain many private details about individuals and associations between various entities. For example, the data may contain association between customers and products (e.g., medications, or drugs) bought from a particular store, e.g., a pharmacy. Although such data can be very useful for scientific research, privacy concerns will require that the data be anonymized before it is made available to users. For example, the data may be represented in the form of a large, sparse bipartite graph. One anonymization approach is to add or to delete some edges in the graph structure. However, adding or deleting edges may radically alter the graph structure, thereby limiting the usability of the data for an analysis involving the graph structure.

SUMMARY OF THE INVENTION

In one embodiment, the present invention discloses a method and apparatus for providing an anonymization of data. For example, the method receives a request for anonymizing, wherein the request comprises a bipartite graph for a plurality of associations or a table that encodes the plurality of associations for the bipartite graph. The method places each node in the bipartite graph in a safe group and provides an anonymized graph that encodes the plurality of associations of the bipartite graph, if a safe group for all nodes of the bipartite graph is found.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Many sets of data can be represented as graph structures that show associations between various entities. For example, one way to model data as a graph structure is using nodes to represent entities and edges to indicate an association between the entities. The analysis may then be performed on the structural properties of the graph.

In one example, a bipartite graph may be used to represent associations between the customers and the products and/or services that the customers buy. In another example, a bipartite graph may be used to represent associations between authors and papers. In another example, a bipartite graph may be used to represent associations between viewers and websites visited. In another example, a bipartite graph may be used to represent associations between students and courses taken. In yet another example, a bipartite graph may be used to represent associations between travelers and places visited and so on. Analyzing the information in these graphs may provide insight to researchers, marketers, etc. For instance, one might wish to determine if a product is more popular in certain locations, segments of a population, and so on.

There are many reasons for encoding the data in a graph structure. For example, queries may be answered using the graph structure. In another example, one may wish to share the data with others for scientific research purposes, but privacy concerns may prevent sharing of the raw data. That is, the raw data may contain particularly sensitive information and may not be appropriate for sharing. For example, the raw data may contain personal details or personal information pertaining to the users, a list of other products purchased, and so on. Hence, a provider of the data, e.g., a network service provider, may wish to anonymize such data to guarantee privacy of the data subjects while simultaneously maximizing the utility of the resulting anonymized data.

For most data, only a small fraction of associations are present. For instance, a customer buys only a small fraction of the available products, and a product is bought by a small fraction of the total customers. Similar observations hold for publication data about authors and the papers they have written. In other words, the resulting graphs are quite sparse, and care should be taken to ensure that these associations are not easily revealed. Although the data is private, it is still desirable to allow aggregate analysis based on the structure of the graph. For example, pharmaceutical companies may wish to understand which pattern of products are bought by people in particular age ranges; public health organizations may wish to watch for disease outbreaks affecting particular demographics based on certain types of medicine being purchased, and so on.

One approach is to publish the raw data. Publishing the raw data would allow these questions to be answered directly but would clearly fail to satisfy the privacy needs. Another approach is having a model where the data owner accepts queries, and either adds noise to the results or refuses to answer some queries. However, this approach requires the data owner to be an active participant and limits what analysis is possible.

In one embodiment, the current invention provides an anonymized version of the data, wherein the anonymized version of the data limits the scope of inference of an association from the data while preserving the structure of the underlying graph. This approach allows for a wide variety of ad hoc analyses and valid use of the data, while simultaneously meeting the privacy goals.

In order to more clearly describe the invention, models for the data, privacy and query will first be mathematically defined. The models are then used, as described below, to mathematically present the problem of anonymizing bipartite graphs.

The bipartite graph, also referred to as bigraph, may be represented by G=(V, W, E). The bigraph G consists of m=|V| nodes of one type, n=|W| nodes of a second type, and a set of |E| edges $E \subseteq V \times W$. The bigraph may be used to encode a large variety of data, in particular, a set of existing links between two sets of objects. For example, the bigraph can be used to encode which papers were co-written by a set of authors, which products at a pharmacy were bought by a set of customers, which websites were visited by users, which courses were taken by students, and so on. For the description below, an illustrative example of a set of customers C=V and a set of products P=W is used. An edge (c, p) indicates that a customer $c \in C$ bought a product $p \in P$.

As discussed above, the graph is relatively sparse. That is, each customer typically buys only a small fraction of all products, and each product is bought by only a small fraction of customers (with a few exceptions, e.g., many customers may buy aspirin). As a consequence, the number of edges e is small compared to the number of possible edges, which is n×m. Mathematically defined, a graph is $\alpha$-sparse if $e \leq \alpha nm$. That is, for the current method to succeed, there is a necessary bound on the $\alpha$-sparsity.

In one embodiment, the method may be used by considering graphs with multi-edges, with weights or additional attributes, i.e., in full generality. However, for clarity, the description below uses the un-weighted, undirected, single edge case. The un-weighted, undirected, single edge case has sufficient richness to capture many challenging problems.

In a relational database, the bipartite graph G=(V,W,E) may be concisely represented by three tables, corresponding to V, W and E. For the example above, the concise representation may have:
- a table of customers V, including attributes such as gender and location (for example, from a customer loyalty scheme);
- a table of products W, including attributes such as price, type, and whether the product is available Over the Counter (OTC) or by Prescription Only (Rx); and
- a customer-product table E encoding which customer bought what product.

Figure 1:
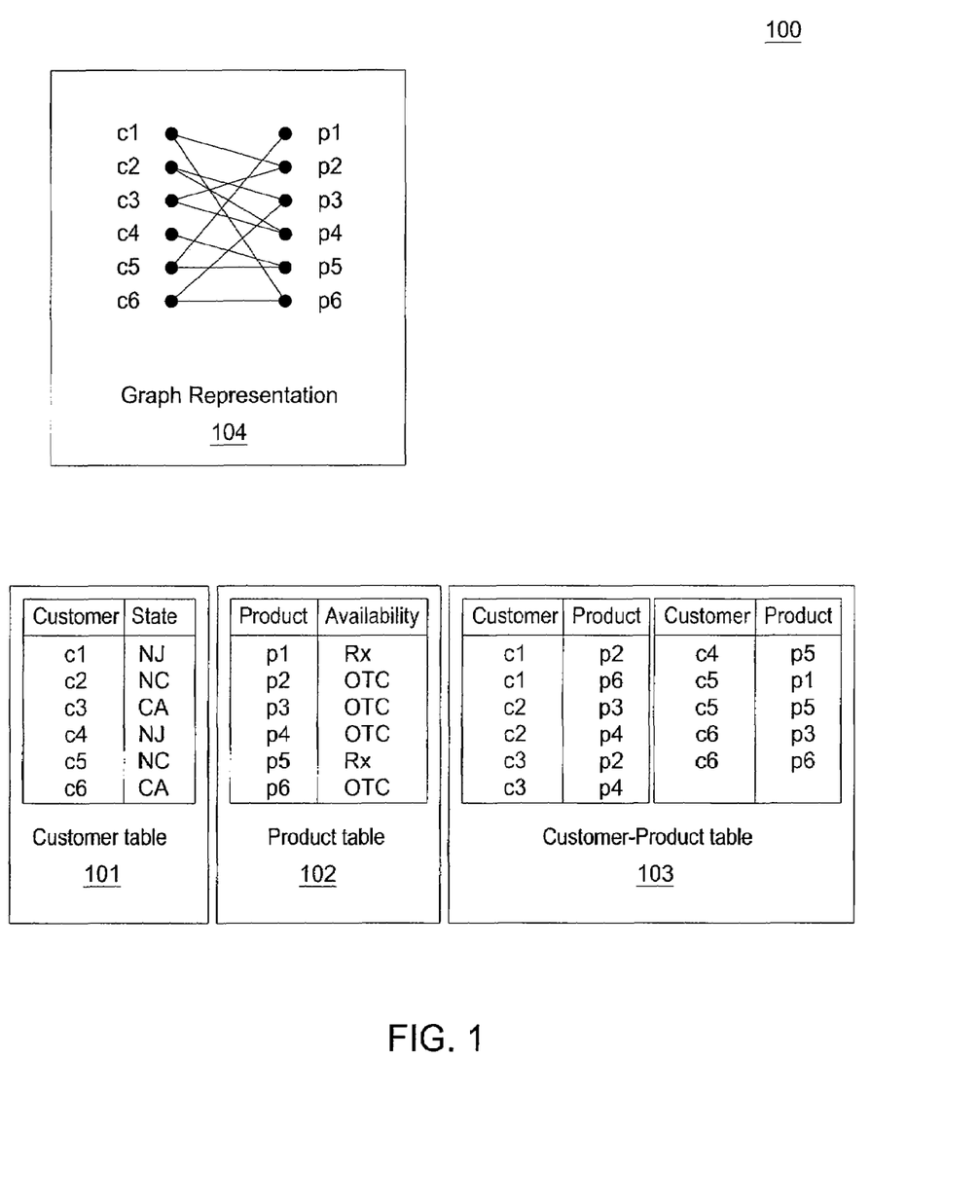
FIG. 1 illustrates an exemplary instantiation of associations related to the current invention.

Thus, entities in the tables V and W correspond to nodes in the graph defined by E, in a 1:1 fashion. FIG. 1 illustrates an exemplary instantiation 100 of associations related to the current invention. For example, table 101 shows a table of customers and a state attribute, providing where the customer is based. Table 102 shows a table of products and an availability attribute, that provides whether the product is available OTC or by Rx only. Table 103 shows a customer-product relationship. Graph 104 shows a graph representation of the customer-product relationship in table 103. In one embodiment, the $\alpha$ sparsity of this graph is 11/36. This means that there are 11 edges (e.g., shown as lines connecting c1 . . . c6 to p1 . . . p6) present out of 36 possible edges. The customer's attribute, state, indicates whether the customer is based in New Jersey (NJ), North Carolina (NC) or California (CA). The availability of a product indicates whether it is Over the Counter or by Prescription Only. Since the graph accurately represents the relational data, the method uses both graph and relational terminology.

Hence, one objective of this invention is to obtain an anonymized version of the above graph G, wherein the obtained graph allows a broad class of queries to be answered accurately, while it maintains the privacy of the associations. The privacy goals (objectives) and classes of queries which may be answered may be defined as described below.

In one embodiment, the privacy objective is that, in many cases, it is the association between two nodes which is private and which needs to be anonymized. For example, the set of customers of a pharmacy may not be considered particularly sensitive, and the set of products which the pharmacy sells may also be considered public knowledge. However, the set of products bought by a particular customer may be considered private and may not be revealed. Hence, the current method focuses on preserving the privacy of the associations, and assumes that properties solely of entities (e.g., state of a customer) are public.

Clearly, there are situations with differing privacy needs. If the privacy needs are different, then the method may be modified to address the corresponding needs. Since it is desirable to allow answering of ad hoc aggregate queries over the data (e.g., how many customers from a particular zip code buy cold remedies), the method assumes that some anonymized version of the data that gives accurate answers to such queries while protecting the individual associations is to be published. In other words, the anonymizing needs to be performed while simultaneously preserving the graph properties of the data. The preserved properties comprise not only simple features (e.g., degree distribution of the nodes) but also more long-distance features (e.g., distribution of nodes reachable within two steps, three steps, etc.).

There is an inherent tradeoff between privacy and utility. Various extreme approaches that maximize one property over another exist. For example, publishing the original data unchanged clearly maximizes utility but offers no privacy. In stark contrast, removing all identifying information and publishing only an unlabeled ("fully censored") graph maximizes privacy but has limited utility for aggregate queries, e.g., queries over nodes satisfying certain predicates.

In some cases, the graph structure may leak information about individual edges. For example, if the underlying graph has an association between every pair of entities (e.g., every customer and every product), then one can clearly determine, from the anonymized graph structure alone, that there is an edge between any pair. In another example, if there are a few nodes with unique degrees and these degrees are known to the attacker, these nodes may be re-identified. But in typical cases, virtually nothing can be deduced from the graph structure alone. The data owner then first needs to determine whether this level of disclosure is acceptable.

In the static attack case, the attacker solely analyzes the information which is published by the scheme and tries to deduce explicit associations from this information. Hence, the number of associations which can be correctly inferred (beyond what is implicit in the censored graph) should be minimal if not made equal to zero.

In the learned link attack case, the attacker may already know a few associations. For example, for the example illustrated in FIG. 1, the attacker may know that customer c1 bought product p2. Hence, the additional associations that can be inferred should be minimal if not zero when the number of link revelations is small.

Note that one is principally concerned with an attacker being able to make positive inferences. For the example illustrated in FIG. 1, one is concerned about an attacker's ability to positively deduce that c6 bought p6. There is less concern about negative inferences, e.g., deducing that c1 did not buy p1. Since the analyzed graphs are sparse and the maximum degree is at most a constant fraction of the total number of nodes, the current method assumes that some negative inferences are possible and the resulting discoveries are acceptable, subject to the following exception. The exception is that, the current method limits some negative inferences intended to eliminate enough possibilities and leave a positive inference. For the example in FIG. 1, learning c4 bought at least one item but did not buy p1, p2, p3, p4, or p6 allows one to infer that c4 bought p5. The current method captures and limits this form of positive inference that may be reached using negative inferences for elimination of possibilities.

In order to properly balance the privacy requirement with utility requirement, the type of queries to be supported by the anonymized graph need to be understood. The current method supports queries that can be answered based on predicates solely over graph properties of nodes or attributes of entities. In one example, predicates solely over graph properties may be based on degrees of nodes, wherein these predicates are denoted by $P_n$. In another example, predicates may be solely over attributes of entities, wherein these predicates are denoted by $P_a$.

For the customer-product example shown in FIG. 1, $P_a$ could select out customers from NJ, or prescription products, while a typical $P_n$ might be that a customer buys a single product. Since a published anonymized graph can evaluate $P_n$ predicates exactly while there may be maximum uncertainty in applying $P_a$ predicates, the method separates these two types of predicates.

In one embodiment, the method supports the following types of queries listed in order of increasing complexity. The queries are based on standard SQL aggregates wherein the standard SQL aggregates comprise: a sum, a count, an average (avg), a minimum (min), and a maximum (max).

Type 0 refers to a query that is based on graph structure only. The query is then to compute an aggregate over all neighbors of nodes in V that satisfy some $P_n$. For example, the query may be to find the average number of products per customer; to compute the average number of customers buying only that product, per product, and so on.

Type 1 refers to a query based on attributes of nodes on one side of the graph only. For example, the query may be to compute an aggregate for nodes in V satisfying $P_a$, to compute an aggregate on edges to nodes in V satisfying $P_n$ from nodes in W satisfying $P_a$. For example, the query may be to find the average number of products for NJ customers, or to find the total number of CA customers buying only a single product.

Type 2 refers to a query based on attribute predicates on both sides. For example, the query may be to compute an aggregate for nodes in V satisfying $P_a$ to nodes in W satisfying $P'_a$. For example, the query may be to count the total number of OTC products bought by NJ customers or the total sales of prescription products to CA customers who buy nothing else.

It should be noted that yet higher orders of queries that are more complex may be defined. The more complex queries may be defined either through more constraints or more steps through the graph. For example, join-style queries may be issued to compute an aggregate of nodes from V at distance 2 from other nodes in V satisfying $P_a$ connected via nodes in W, satisfying $P'_a$. Other graph properties may be included in queries, e.g., measuring the diameter of an induced subgraph, identifying particular patterns of interaction such as complete embedded sub-graphs, and so on.

The above three types of queries (type-0, type-1, and type-2) are sufficiently rich to answer most realistic research questions while also being concise enough for specifying the queries compactly. For example, queries of type 0 can be answered on the fully censored (anonymized) graph exactly. Answering queries of other higher order types may require some more information about attributes of the entities in order to guarantee accuracy.

In one embodiment, the current method provides a family of anonymizations for bipartite graph data. These anonymizations are also referred to as $(k, \ell)$-groupings. The $(k, \ell)$ groupings preserve the underlying graph structure and instead anonymize the mapping from entities to nodes of the graph. This approach ensures that the complex and sensitive graph structure is not affected, and that any analysis based principally on the graph structure will still be correct. The method meets the privacy needs by grouping the nodes and entities while allowing accurate answers for the types of queries described above.

In one embodiment, the method partitions the nodes and the corresponding entities into groups, such that, given a group of nodes, there is a secret mapping from these nodes to the corresponding group of entities. Furthermore, the method prevents publication of any information that would allow an attacker to work out, within a group, which node corresponds to which entity. This approach provides a tradeoff between privacy and utility.

In order to more clearly describe the anonymization, the $(k, \ell)$ grouping is first mathematically defined as follows:

First, let k be defined as a parameter for a group size. A larger k gives more privacy, but reduces the utility. Given a set V, a k-grouping is a function H mapping nodes to "group identifiers" (e.g., integers) so for any $v \in V$, the subset $V_v = \{v_i \in V : H(v_i) = H(v)\}$ has $|V_v| \geq k$. Mathematically defined, $\forall v \in V : \exists V_v \subset V : |V_v| \geq k \wedge (\forall v_i \in V_v : H(v_i) = H(v))$. That is, the function H partitions V into subsets of size at least k. The k-grouping is said to be strict if every group v has size exactly k or k+1. In other words, a k-grouping partitions V into non-intersecting subsets of size at least k. The k-grouping ensures that each group is at least size k to meet the privacy goals. The strictness property ensures that all groups in a k-grouping are close to k in size (not much larger than k), since smaller groups allow more accurate query answering. The method uses this definition of grouping to publish a modified version of the graph.

Let $F_V$ be a relabeling function to relabel elements of V injectively onto a new set $F_V(V)$; and let $F_W$ be a relabeling function to relabel elements of W injectively onto a (disjoint) set $F_W(W)$.

Given a k-grouping on V, $H_V$, and an $\ell$--grouping on W, $H_W$, of a graph G=(V, W, E), define the $(k, \ell)$-grouped graph G' as $G' = (V, W, H_V, H_W, E', R_V, R_W)$ where:
 (a) V and W are the original sets of entities V and W, and $H_V$ and $H_W$ are the grouping functions defined above.
 (b) E' is the relabeled edge set given by $E' = \{(F_V(v), F_W(w)) | (v,w) \in E\}$.
 (c) $R_V$, $R_W$ are re-mappings defined by $R_V(F_V(v \in V)) = H_V(v)$ and $R_W(F_W(w \in W)) = H_W(w)$.
When both $H_V$ and $H_W$ are strict, this is a strict $(k, \ell)$-grouping.

With this definition, when the present invention discloses producing a "safe group" or "safe grouping", the present invention refers to the production of an anonymized graph wherein nodes are arranged into groups in accordance with the safety condition defined above, and the graph is described by detailing for each group, the set of nodes present in the group and the set of entities corresponding to the nodes, but without divulging the mapping between the entities and the nodes. An example of this is displayed in FIG. 2, wherein the mapping between nodes and entities is not disclosed.

Figure 2:
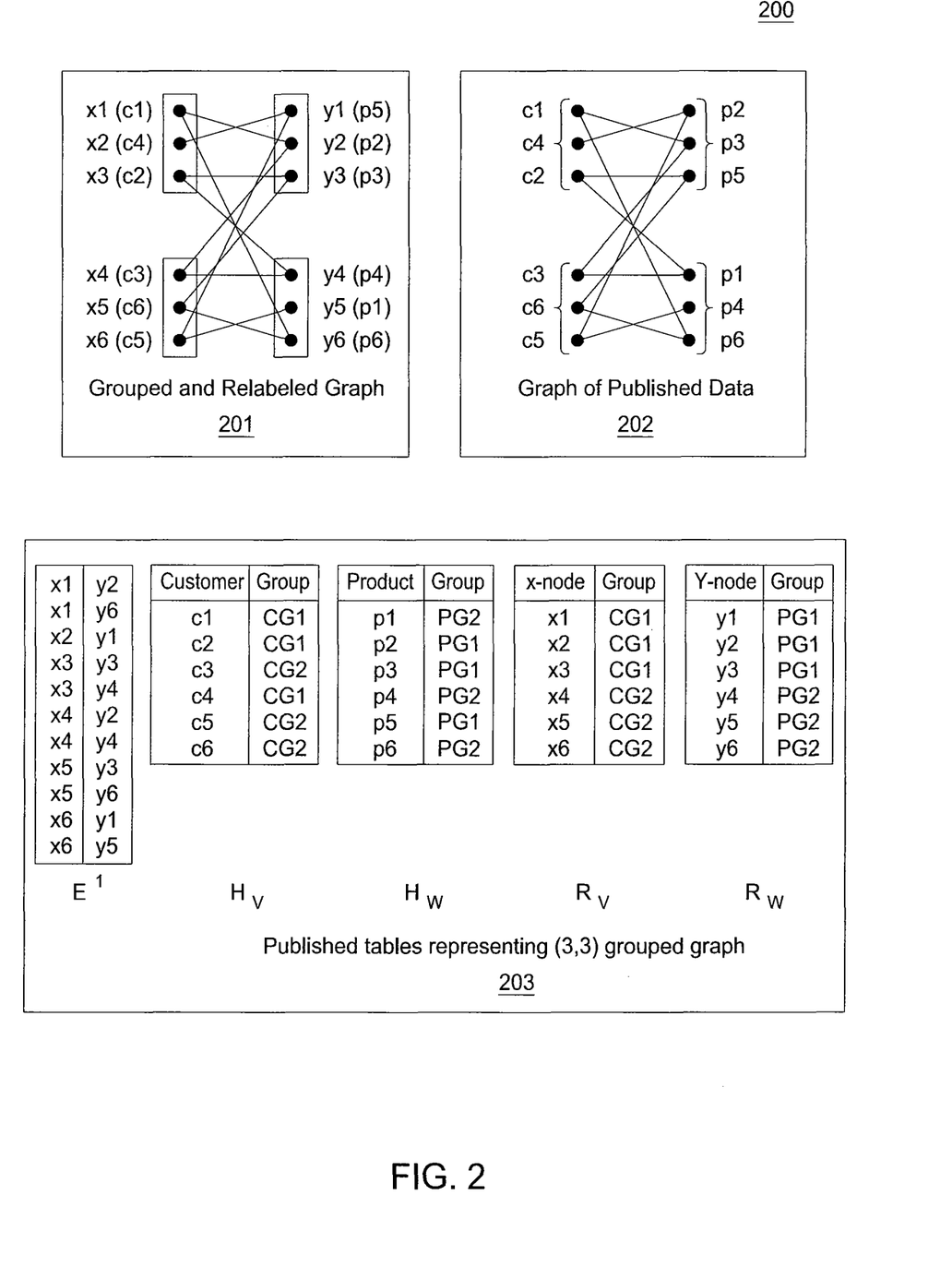
FIG. 2 illustrates an exemplary anonymization of the example associations of FIG. 1 using a (3,3) grouped graph.

FIG. 2 illustrates an exemplary anonymization 200 of the example associations of FIG. 1 using a (3,3) grouped graph. The method sets groups for the customers as CG1 and CG2 (customer groups 1 and 2) and for the products as PG1 and PG2 (product groups 1 and 2). Namely, $$H_C^{-1}(CG1)=\{c1,c2,c4\}$$

$$H_C^{-1}(CG2)=\{c3,c5,c6\}$$

$$H_P^{-1}(PG1)=\{p2,p3,p5\}$$

$$H_P^{-1}(PG2)=\{p1,p4,p6\}$$

This is a strict (3,3)-grouping since every customer group and every product group has (exactly) three members. The resulting grouped graph is shown in graph 201, with the arbitrary relabeling of nodes on xi's and yi's. Graph 203 shows the published tables representing the (3,3) grouped graph. The published data can then be derived. Graph 202 provides the result compactly as a graph representation that shows the edge structure and which sets of nodes map to which sets of entities while hiding the exact mapping.

The grouping functions, $H_V$ and $H_W$, contain most of the necessary information to specify the modified graph as a function of the original graph G. This definition is well-suited for storage within a relational database.

For example, in the customer-products example of FIG. 1, the method publishes: customer and product relations as before (corresponding to V and W); customer-group and product-group tables which encode the mapping of each customer and product to groups (corresponding to $H_V$ and $H_W$); a masked-customer-product relation, in which each customer and product is mapped to a new node id (E'); and lastly masked-customer-group and masked-product-group tables which map from the masked identifiers to groups ($R_V$ and $R_W$). Note that the base relations corresponding to V and W should not contain any information relating to the graph, such as the degree of the node. Otherwise, an attacker could potentially use this to re-link between rows of V or W and nodes in E'.

Two further examples of groupings that illustrate extremes of the privacy-utility tradeoff are provided below. The first example corresponds to the smallest groups and the second example corresponds to the largest groups.

For the smallest group, the method sets $H_V(v)=v$ and $H_W(w)=w$ (the identity functions) to achieve a (1,1)-grouped graph G'. Here, E'=E, and hence G' encodes the original graph G exactly. Every query on G' can be answered with the same accuracy as on G. So there is perfect utility, but no more privacy than when the method began.

For the largest group, the method sets $H_V$ to map all m=|V| members of V to the same group, say 0, and sets $H_W$ to map all n=|W| members of W to, say, group 1. The largest grouping then gives the (m, n)-grouped graph G'. G' has no useful information that maps entities in V,W and the node set of E'. That is, the method publishes entity tables and the fully censored graph. Recall that the method assumes that it is acceptable to publish a censored graph, and so this grouping guarantees the same level of privacy. This is the case where the mapping from entities to nodes is completely hidden. In the customer-product example, this entails publishing the customers' relation and products' relation unchanged (since these are not considered private). In addition, the method applies an injective masking function F on the customer-product relation so that each (c, p) pair is mapped to (F(c),F(p)), and publishes the resulting censored table. This retains the graph structure, as required, but completely removes the mapping from entities (e.g. customers and products) to nodes in the graph. Clearly, the method cannot have any more privacy in this setting. Since any selective attribute predicate cannot be applied with any certainty, this offers very limited utility in answering query types 1 and 2.

Between these two extremes, lie many possibilities that trade off utility and privacy. Given a (k, $\ell$)-grouped graph, where both k and $\ell$ are fairly small, aggregate queries can be answered approximately. In one embodiment, bounds can be placed on the answers within which the true answer must fall. When k and $\ell$ are small, these bounds are narrow; as k and $\ell$ grow large, the bounds widen accordingly. Clearly, a (k, $\ell$)-grouping offers more utility (and less privacy) than a (k', $\ell$)-grouping if k<k'; the same holds true between (k, $\ell$)- and (k, $\ell'$) groupings for $\ell < \ell'$. But one cannot easily compare (k, $\ell$)- and (k', $\ell'$)-groupings unless k<k' and $\ell < \ell'$. Thus, choices of k and $\ell$ define a lattice over possible groupings, bounded by (1,1) and (m,n).

Given that there are many ways to form a grouping and given the fact that all groupings do not offer the same level of privacy, the current method introduces a condition of safety which ensures that privacy holds even under revelation of certain information. For example, consider a large graph G, which happens to contain the complete sub-graph between nodes $\{v_1,v_2,v_3\}$ and $\{w_1,w_2,w_3\}$. Suppose three groupings on V and W are formed, so that $\{v_1,v_2,v_3\}$ forms the entirety of one group in $H_V$, and $\{w_1,w_2,w_3\}$ forms the entirety of a group in $H_W$. From the published G', it is possible to infer immediately all the connections between these six nodes. Inferring all the connections between all six nodes is an example of a static attack. Such inference is not possible on the fully censored version of G', but the unfortunate choice of grouping allows information to leak. Attempts to fix this, such as insisting that the density of edges between any pair of groups is low, are not guaranteed to remain true as edges are learned by an adversary. Hence, in one embodiment the current method defines a stronger notion of "safe grouping", which is robust against both static and learned link attacks.

For example, $H_V$ is a safe grouping of V in the context of a graph G=(V, W, E), if the following condition holds:

$$\forall v_i \neq v_j \in V: H_V(v_i) = H_V(v_j) \Rightarrow \nexists w \in W: (v_i, w) \in E \wedge (v_j, w) \in E$$

By extension, a (k, $\ell$)-grouping of a graph G is safe if $H_V$ and $H_W$ are both safe groupings. That is, a safe grouping ensures that any two nodes in the same group of V have no common neighbors in W. The definition for a safe grouping of W is symmetric and can be defined by interchanging the roles of V and W. This ensures a level of sparsity between groups, but goes further in restricting the pattern of allowed links. In the customer-products example of FIG. 1, this level of sparsity means that no two customers in the same group have bought the same product if the grouping is safe. Hence, the groupings in FIG. 2 are safe. Clearly, all 1-groupings are trivially safe. For k>1, given G, there is no guarantee that there exists a safe k-grouping. However, in practice, safe groupings with k>1 are easy to find as described below.

A necessary condition for the existence of a safe (k, $\ell$)-grouping arises from the sparsity of the graph. A group of size k in V and a group of size $\ell$ together induce a sub-graph of G which could have at most $k\ell$ edges. However, if the grouping is safe then, within the induced sub-graph, any node can have degree of at most 1. Otherwise, there are two nodes with a common neighbor.

Figure 3:
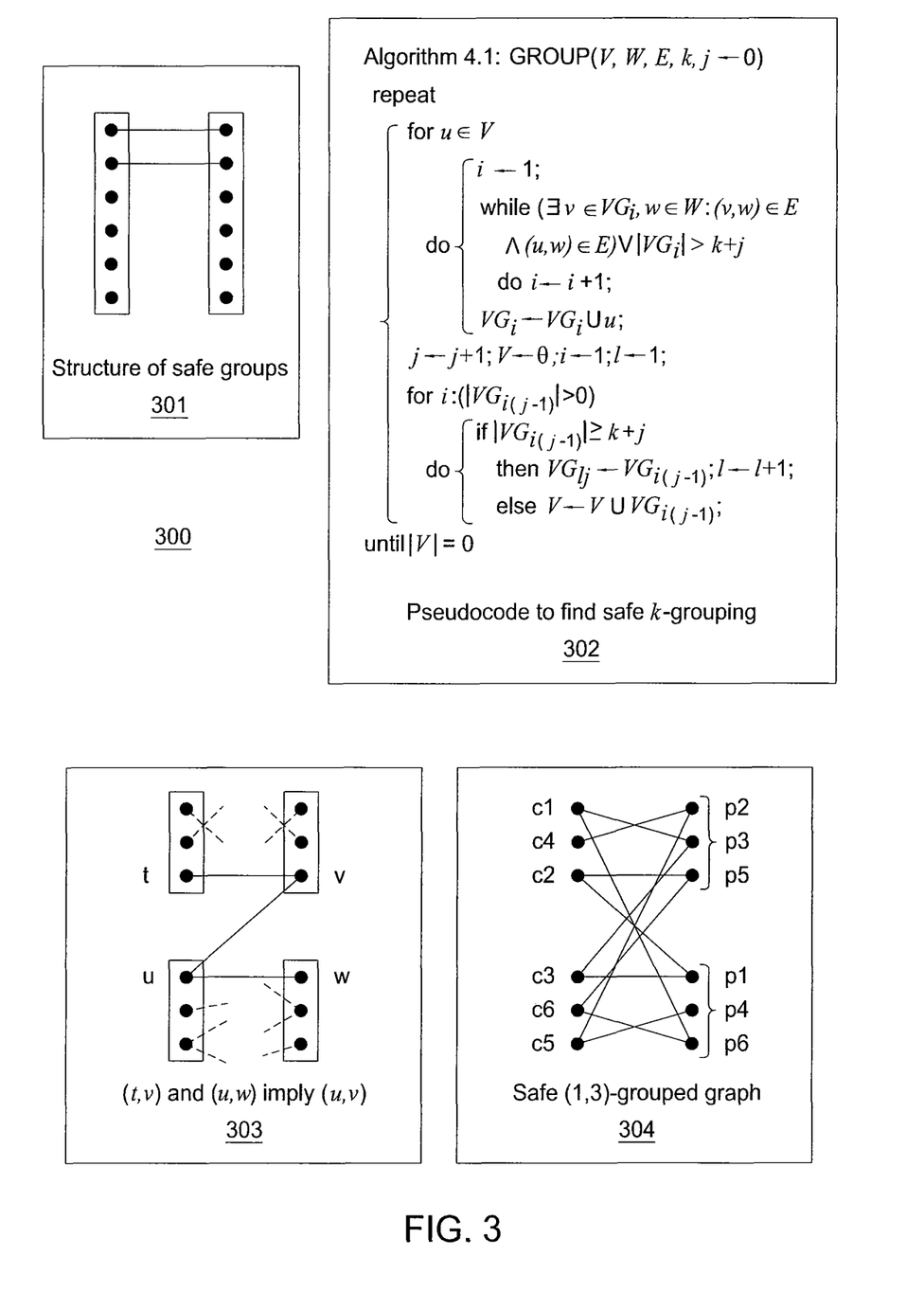
FIG. 3 illustrates a typical structure between two groups of size k=6 and $\ell$=6.

FIG. 3 illustrates a typical structure 300 between two groups of size k=6 and $\ell$=6. So, there can be at most min (k, $\ell$) edges between these two groups. This is true for every possible pair of groups. Since every edge touches exactly two groups, the $\alpha$-sparsity of the sub-graph, defined by $\alpha$=|E|/ |V||W|, can be at most min(k, $\ell$)/(k$\ell$)=1/max(k, $\ell$). Finding a k-grouping when all groups are forced to be size k can be hard even for small values of k. Specifically, finding a safe, strict 3-grouping is NP-hard.

However, safe groupings can be found when the graph is sparse enough. For example, for a bigraph G=(V,W,E) where every node has degree 1 (i.e., E gives a matching between V and W), every possible grouping is trivially safe. More generally, when the graph is sparse and does not have nodes which have (almost) all possible neighbors, safe k-groupings can be found for practical values of k (1-100, for example). The constraints posed by the edges of the graph are easy to satisfy when not too many edges are present.

Most of the graph types discussed above are quite sparse and have few nodes of high degree. For example, most shoppers purchase only a small number of the items on sale in a store, and most items are purchased by a small fraction of all shoppers. In another example, most authors write only a small number of papers relative to the total number of papers written, and most papers have a small number of authors. Studying the data from DBLP (Digital Bibliography and Library Project), the most prolific author has written around 400 papers (out of 500K), and the most authors on a single paper is about 100 (out of 400K). In total, there are only 1.4M edges in the author-paper graph, out of a possible 400K×500K=200, 000M. This example demonstrates that typical association data is very sparse ($\alpha$=7×10$^{-7}$-sparse, as defined above).

The above description focused on modeling of the data. The method now turns to modeling or analysis of security— an analysis of what can be deduced by an attacker presented with a safe (k, $\ell$)-grouping of graph data, where at least one of k and $\ell$ are greater than 1.

First, the analysis clearly shows that safe groupings are secure against the static attacks. In a safe grouping, given nodes v$\in$V and w$\in$W in groups of size k and $\ell$ respectively, there are k$\ell$ possible identifications of entities with nodes, and the edge (v,w) is in at most a 1/max(k, $\ell$) fraction of such possible identifications.

Under this measure, a (k,1)-grouping offers the same static guarantee as a (k,k)-grouping. The requirement is that between two groups the fraction of sensitive information (associations that are present) is bounded by 1/max(k, $\ell$), ), which is similar to the $\ell$- -diversity requirement. If there are small groups, the attacker's confidence in a particular association can be higher. In particular, two groups of size 1 with an edge between them correspond to a known association between entities. Although a safe (k, $\ell$)-grouping has no groups of size 1, in the active (learned link) attack model, when an attacker learns the existence of an edge (v,w), the attacker may be able to refine the grouping in order to create groups of size 1.

Consider the four groups shown in FIG. 3, graph 303, and the three edges that connect them. Other nodes in the same groups have edges to other groups (shown as dashed lines) which do not affect this example. In the static case, as proved above, the attacker cannot make any strong inferences. However, in the learned link case, if the attacker learns (t,v) is an edge, the attacker can use the fact that there is only one edge between the group of t and the group of v to identify t and v with nodes in the anonymized graph. Likewise, learning (u,w) allows u and w to be identified with the nodes that represent them. As a consequence, the attacker can infer that (u,v) is an edge, no matter how many other nodes are in the groups. The example shows that revealing an edge may allow an attacker to learn more about the nodes that it connects, and then infer more about the connections between such nodes. But the amount revealed about entities for which the attacker does not have information is minimal. A relaxed grouping definition allowing a few groups of size one enables this intuition to be formalized as follows.

First, define a (k, $\ell$) *$^{(p,q)}$-grouping as a grouping in which removing at most p nodes from V leaves a k-grouping of the remaining nodes of V, and removing at most q nodes from W leaves an $\ell$-grouping of the remaining nodes of W.

Then, observe that a (k, $\ell$))-grouping is also a (k, $\ell$))*$^{(0,0)}$-grouping. Also, by applying the above discussion of safe groupings, note that a safe (k, $\ell$))*$^{(p,q)}$-grouping still gives a lot of privacy for nodes in the grouping. Namely, between a group of size k and one of size $\ell$, , each possible edge is present in at most a 1/max(k, $\ell$) fraction of possible configurations, just as before. But also, between a group of size 1 and one of size $\ell$, , there can be at most one edge in a safe grouping, and the edge is present in at most a 1/$\ell$ fraction of possible configurations. Symmetrically, between a group of size k and one of size 1, the (at most one) edge is present in at most a 1/k fraction of possible configurations. Only between two groups of size one can one infer the existence (or absence) of an edge with certainty.

In the learned link case, given a safe (k, $\ell$))-grouped graph and r<min(k, $\ell$)) true edges, the most an attacker can infer corresponds to a (k–r, $\ell$–r)*$^{(r,r)}$-grouped graph. This can be shown by induction over the revelation of r edges as described below.

The base case r=0 yields the (k, $\ell$) *$^{(0,0)}$-grouped graph. In the inductive case, there is a (k–r, $\ell$–r)*$^{(r,r)}$-grouped graph, and an additional edge (v,w) is learnt. As shown in the example above, in the worst case, this is enough to identify which node in the anonymized graph is v and which is w. This corresponds to refining of the groups such that: if v was in a group of size at least k–r, it is effectively split into a group of size 1 (containing v alone), and the remaining nodes now form a group of size at least k–r–1. Likewise, the group containing w is split into one of size 1 containing w alone, and one of size at least $\ell$–r–1. The resulting grouping is therefore at least a (k–r–1, $\ell$–r–1)*$^{(r+1,r+1)}$-grouping.

Note that the identification of v and w reveals nothing about any other nodes, even those connected to v and w. More precisely, the resulting grouping is still safe by definition. The crucial observation is that any refinement of a safe grouping by partitioning groups into smaller pieces remains safe. Appealing to the above safe grouping definition reveals that the attacker cannot infer any associations beyond those that are revealed by the grouping directly (i.e. only those links between groups of size one). This is sufficient to bound the new knowledge by the (k–r, $\ell$–r)*$^{(r,r)}$-grouping. This is directly comparable to results on tabular data k-anonymization where the aim is to ensure that individuals are secure up to the revelation of k–1 pieces of information about other individuals. Here, individuals and their associations are secure up to the revelation of k–1 pieces of information (edges) about others.

In one embodiment, the current method provides a greedy algorithm for finding a safe k-grouping of V. Pre-computing the self-join of the edge table E on W allows for testing of whether it is safe to put two nodes in the same group. The algorithm works as described below.

For each node u, in turn, the algorithm attempts to place u in the first group of the partial grouping with fewer than k nodes. If placing u in a group would make the grouping unsafe, the method tries the next group, and so on. If there is no group that meets these requirements, then the method starts a new group that contains u alone. After processing all nodes, there may be some (few) groups with fewer than k nodes in them. The algorithm collects these nodes together, and reruns the above algorithm allowing for groups of size k+1 instead of k. If the graph is sufficiently sparse, then a safe grouping in which every group has either k or k+1 nodes in it is produced, and so the grouping is strict. Otherwise, the algorithm continues but now allows groups up to size k+2, and so on. Eventually, either a safe grouping is found, or the algorithm terminates once some large group size is reached. In this case, the method fails, but can be run again by choosing a different ordering of the nodes, or by picking a smaller value of k.

An exemplary pseudo-code of an algorithm for finding a safe-grouping is shown in view 302 of FIG. 3. Initially all groups in the jth iteration ($VG_{i,j}$) are set to empty. Then, for each node u in the current set of nodes that is not yet allocated to a group, V, the algorithm tries each group in turn; if adding the node to that group would violate the safety condition, or cause the size of the group to exceed the current size limit j, then it moves to the next group (eventually, it will find an empty group, in which the item can be placed safely). Once all nodes have been processed, the algorithm then iterates over each non-empty group. If the group is not too small, then it gets copied as a group for the next iteration; else, the group is too small, and the nodes are returned to the set V for processing in the next round. The process terminates when all groups are at least size k, and by their formation must constitute a safe grouping.

As illustrated in the example above, the algorithm can find strict safe k-groupings for small values of k. There is an opportunity to optimize by choosing an initial ordering for the nodes, with the aim of giving better accuracy on queries. When a selective predicate is evaluated over a group, tighter query bounds are given when either all (almost) nodes in the group are selected, or none are selected. When a handful of nodes are selected from a group, there will be more uncertainty in answering the query. Putting similar nodes in a group together will therefore give higher accuracy. In one embodiment, nodes are placed together in groups based on the similarity of their attributes. In this embodiment, it is possible that knowing that groups were formed in a particular way could allow an attacker to deduce some information about the identity of nodes and hence have a greater belief in the probability of certain associations.

In one preferred embodiment, the current method publishes the grouping algorithm and anyone will find the same groups of nodes given the same unlabeled graph. Therefore, if groups are chosen solely on graph properties, no information relating to the mapping of nodes to entities is derived from the choice of which nodes to group together. This still gives many possibilities. For example, to improve accuracy on queries involving graph properties such as node degree, sorting by node degree will greatly improve query answering. For example, sorting by node degree will greatly improve the accuracy of query answering on queries which involve the node degree (e.g., a query to count all customers buying only a single product). The sorted list of degrees of neighbors may be used to break ties. Other arrangements are possible. For example, groupings may be found by an arbitrary ordering of the nodes or by first sorting the list in the manner outlined.

In one embodiment, the method then answers aggregate queries accurately and efficiently from a published (k, $\ell$)-grouped graph. For example, the queries considered above (customer and product, author and paper, etc.) may be answered. For instance, E' is isomorphic to E and queries of type 0 are answered solely based on the underlying graph structure. Hence, type 0 queries can be answered exactly. Queries of type 1 and 2 cannot guarantee perfect accuracy, since it is not possible to determine exactly which nodes their predicates select. However, they can be answered approximately, by providing bounds and expected values on the aggregate query. Exemplary analysis of various typical cases is provided below.

In one example, a typical type 2 query is of the form "count the total number of OTC products bought in NJ". Since the set of products within each group is known, the number of nodes selected by the product predicate in a group is easily found. The same is true for any customer group. The tightest bounds follow from evaluating the query over all possible assignments of entities to nodes, but this would be very costly. That is, finding the best upper and lower bounds for answering an aggregate query of type 2 is NP-Hard.

Instead of the above NP-hard bounds, the method obtains slightly weaker bounds by considering each pair of groups in turn to find bounds on the query answer. For instance, consider answering the query "Count the total number of OTC products bought in NJ".

Given a safe group $CG_i$ of $k_i$ customers of whom: $a_i$ are NJ customers; a safe group $PG_j$ of $\ell_j$ products, of which $b_j$ are OTC products; and $c_{ij}$ edges between the two groups, the following bounds are obtained:

(i) There can be a contribution of at most $U_{i,j}=\min(a_i,b_j,c_{ij})$ to the query (Upper Bound). The total contribution over all customer groups $CG_i$ is at most $U_j=\min(\Sigma_i U_{i,j}, b_j)$, and the final bound over all product groups is $U=\Sigma_j U_j$.

(ii) There is a contribution of at least $L_{i,j}=\max(0,a_i+b_j+c_{ij}-k_i-\ell_j)$ to the query (Lower Bound). The bound over all customer groups is $L=\max_i L_{i,j}$.

The method can sum this to get the overall lower bound, $L=\Sigma_j L_j$.

(iii) Treating all assignments of nodes to entities as equally likely, the expected selectivity between $CG_i$ and $PG_j$ is $$E_{ij} = \frac{a_i b_j c_{ij}}{k_i \ell_j^2}$$

(Expected Bound).

Assuming independence and using the inclusion-exclusion principle, the estimated expected bound over all groups is $E_j=\ell_j(1-\Pi_i(1-E_{i,j}))$. The expected bound for the query is then $E=\Sigma_j E_j$. These can be verified by case analysis over the structure in FIG. 3, graph 301. Such queries can be answered in time O(|E|), since each edge in the original graph connects a single pair of groups, and for groups with no edges between them ($c_{ij}=0$), $U_{i,j}=L_{i,j}=E_{i,j}=0$.

For example, the query "find the maximum number of CA customers buying a single Rx product" can be answered by considering, in turn, each node that could possibly be a CA customer, and finding exactly the products bought alone associated with that node. That is, the node is in a group which contains at least $a_i \geq 1$ CA customers. Upper and lower bounds increase if there are $b_j \geq 1$ Rx products or no fewer than $\ell_j$ Rx products in the product's group of size $\ell_j$, respectively. These imply upper and lower bounds on the global maximum. Similarly, expected bounds follow by assuming a customer has probability of being in CA with probability $a_i/k_i$ in a group of $k_i$ customers; and that a product in a group of $\ell_j$ product has probability $b_j/\ell_j$ of being by prescription only. As this example shows, the method has to do a constant amount of work for each edge in the original bigraph. Hence, the computational cost is O(|E|).

The focus in the discussion above has been on associations between entities of differing types. However, more is revealed about associations between entities of the same type. This is because, the true mapping from one set of nodes to entities is revealed. For example, a significant class of groupings arises when all groups of one set of nodes are of size 1. These are (k,1)—(or symmetrically, $(1,\ell)$ )—) groupings. In the customer-products example, a $(1,\ell)$ )-grouping reveals exactly: how many products a particular customer has bought, who has bought the same product, and so on, while still protecting the exact associations.

FIG. 3, graph 304 shows a safe (1,3)-grouping of the example data in FIG. 1, graph 103. The corresponding published tables are $H_W$ and $R_W$ as shown in FIG. 2, graph 203; $H_V$ and $R_V$ are not needed, since V maps directly onto the nodes of E'. Despite this information being revealed, the private associations between customers and products are still hidden. That is, although graph 304 shows that customers c1 and c3 bought the same product, the product could be any one of {p2,p3,p5}.

This example again resembles $\ell$-diversity. That is, any customer is known to have bought one product out of a group of $\ell$. Given, a safe (k,1)-grouping, any edge still is between one of k equally likely nodes of V, and given r edge revelations, an attacker is still faced with a $(k-r,1)*^{(r,0)}$-grouped graph. While information is revealed about interactions between one set of nodes (customers, in the example above), in many cases, this information release may be permissible. If it is acceptable to release such information, higher accuracy on queries is provided.

For (k,1) and $(1,\ell)$ ) groupings, queries are answered the same way as for the more general $(k, \ell)$ ) groupings. However, many queries are answered more accurately, since the amount of uncertainty is reduced. For the examples above, $a_i=k_i=1$ or $b_j=\ell_j=1$ simplifies the bounds. In particular, some queries of type 1 can be answered exactly: if the predicate is on the 1-grouping, the correct set of entities can be found exactly, which allows the exact answer to the aggregate query to be found.

Type-2 queries can also be answered with tighter bounds. For the OTC example above, the query over a (k,1)-grouped graph is a query for the set of OTC products and it is known precisely. For example, for each OTC product, the method adds 1 to the upper bound if there is a buyer in a group that contains a NJ customer. The method also adds 1 to the lower bound if there is a buyer in a group in which everyone is in NJ. For the expected bound, the expectation that a customer in a group of size $k_i$ with $a_i$ NJ customers is $E_{i,j}=a_i/k_i$, so the probability of any buyer of the product being from NJ is $1-\Pi_i(1-E_{i,j})$. Similarly, considering all single products bought by NJ customers exactly, the method may find the corresponding bounds on products which are sold by prescription only (upper, lower, and expected).

Figure 4:
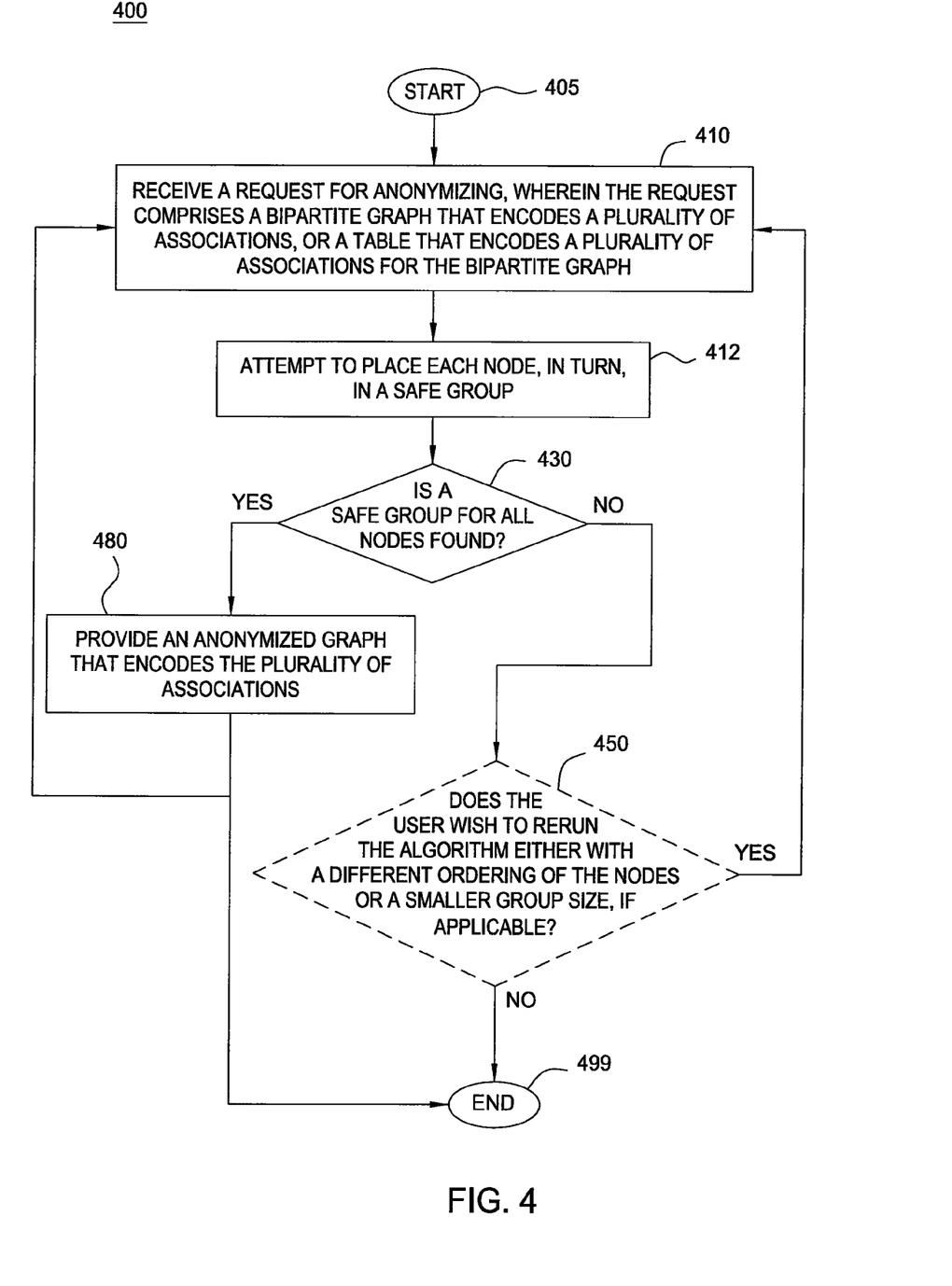
FIG. 4 illustrates a flowchart of the method for providing anonymization of data.

FIG. 4 illustrates a flowchart of the method 400 for providing anonymization of data. For example, a data owner (e.g., a network service provider, a host of a networking service, a website provider, a merchant, etc.) may enable a processor in an application server located in a network to interact with users to provide anonymized data. Method 400 starts in step 405 and proceeds to step 410.

In step 410, method 400 receives a request for anonymizing, wherein the request comprises a bipartite graph that encodes a plurality of associations, or a table that encodes a plurality of associations for the bipartite graph.

For example, the method may receive a bipartite graph that consists of: nodes of a first type, nodes of a second type, and a set of edges associating nodes of the first type with nodes of the second type. Alternatively, the associations in the bipartite graph (e.g. G=(V,W,E)) may be concisely represented and provided in a tabular format. For example, for the customer-product association of FIG. 1, the concise tabular representation may include: a table of customers V, a table of products W, and a customer-product association table E encoding which customer bought what product.

In one embodiment, the method also receives a value for a parameter of a group size, and a limit for a group size. For example, the method receives a value for a parameter of a group size, such as a value for k, and a maximum value for a group size, such as k+1, k+2, etc.

In one embodiment, the application server may determine the group size. For example, the data owner may have a guideline for determining the group size based on the properties of the received bipartite graph. In another example, the method may use a predetermined number and make adjustments as needed. For example, if the algorithm has to be rerun multiple times to achieve the anonymized graph, the method may change the group size accordingly.

Figure 5:
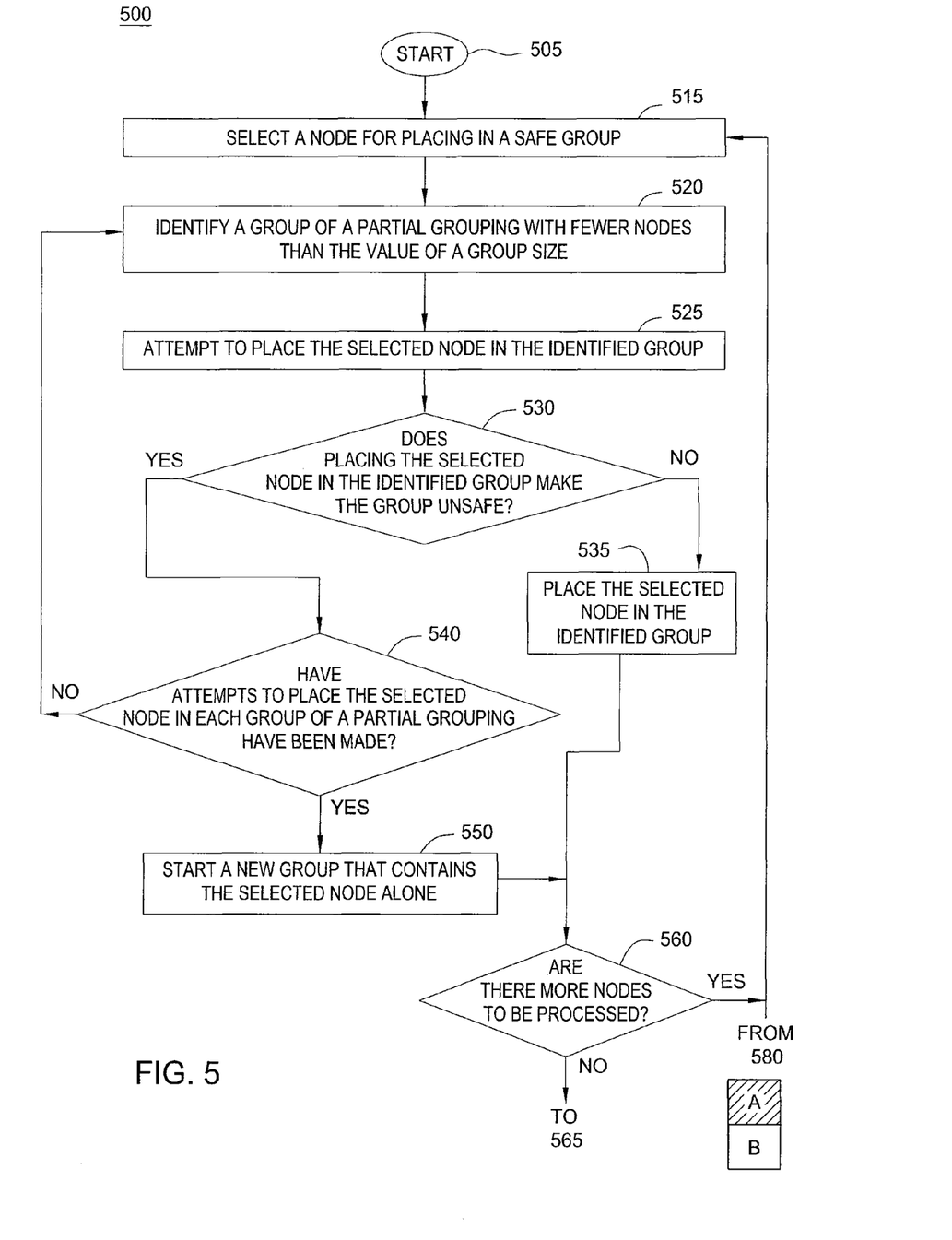
FIG. 5 illustrates one embodiment of a method for placing each node, in turn, in a safe group.

In step 412, method 400 then attempts to place each node, in turn, in a safe group. FIG. 5 illustrates one embodiment of a method 500 for placing each node, in turn, in a safe group as discussed below.

In step 430, method 400 determines if a safe group (grouping) for all nodes is found. If a safe group for all nodes is found, the method proceeds to step 480. Otherwise, the method proceeds to optional step 450.

In optional step 450, method 400 determines if the user wishes to rerun the algorithm either with a different ordering of the nodes or a smaller group size, if applicable. For example, the user may rerun the algorithm by selecting a different ordering of the nodes or a smaller value of k. If the user wishes to rerun the algorithm, the method proceeds to step 410. Otherwise, the method proceeds to step 499 to end processing the current bipartite graph.

In step 480, method 400 provides an anonymized graph that encodes the plurality of associations. By its construction, the anonymized graph is safe and is outputted to the user. The method then proceeds to step 499 to end processing the current bipartite graph. Alternatively, the method may proceed to step 410 to receive another bipartite graph.

FIG. 5 illustrates one embodiment of a method 500 for placing each node, in turn, in a safe group. Method 500 starts in step 505 and proceeds to step 515.

In step 515, method 500 selects a node for placing in a safe group. For example, the method may select a customer to place in a safe group. The method then proceeds to step 520.

In step 520, method 500 identifies a group of a partial grouping with fewer nodes than the value of a group size. For example, the method may identify a first group with a partial grouping of customers that currently has less than k customers.

In step 525, method 500 attempts to place the selected node in the identified group. For example, the method attempts to place the selected node in the first group with fewer than k nodes.

In step 530, method 500 determines if placing the selected node in the identified group makes the grouping unsafe. If placing the selected node in the identified group makes the group unsafe, the method proceeds to step 540. Otherwise, the method proceeds to step 535.

In step 535, the method places the selected node in the identified group. For example, the method places the customer in the identified group. The method then proceeds to step 560.

In step 540, method 500 determines if attempts to place the selected node in every group of a partial grouping have been made. For example, the method determines if an attempt to place the node in each partial group has been made without success. If attempts to place the selected node in every group of a partial grouping have been made, the method proceeds to step 550. Otherwise, the method proceeds to step 520 to identify another group of a partial grouping.

In step 550, method 500 starts a new group that contains the selected node alone. For example, each attempt to place the selected node in a group that already contains at least one node has been unsafe. Hence, the method starts a new group for the selected node.

In step 560, method 500 determines if there are more nodes to be processed. If all nodes have been processed, the method proceeds to step 565. Otherwise, the method returns to step 515.

In step 565, method 500 determines if there is at least a group with fewer nodes than the value of the group size. For example, after processing all nodes, there may be some groups with fewer than k nodes in them. If there is at least a group with fewer nodes than the value of the group size, the method proceeds to step 570. Otherwise, the method proceeds to step 585.

In step 570, method 500 determines if the maximum group size has been reached. For example, the method determines if the data owner has allowed group sizes of k+1, k+2, etc. and if so, determines if those group sizes have been tried. If the maximum group size has been reached, the method proceeds to step 585. Otherwise, the method proceeds to step 575.

In step 575, method 500 collects all the nodes placed in groups with fewer nodes than the value of the group size for re-processing. For example, if k=3, the method collects all the nodes currently in group sizes of one and two for reprocessing.

In step 580, method 500 increments the group size by one. For example, the method allows the groups to be of size k+1 instead of just k. The method then proceeds to step 515 to select a node from among the nodes that are being reprocessed. The method then reruns the above algorithm with every group having either k or k+1 nodes. Note that the process of finding a safe group continues until the maximum allowed group size is tried. For example, the maximum group size allowed may be k+2. The method continues to attempt placing the nodes in a safe group of at least k nodes until groups of size k, k+1, k+2 are tried.

In step 585, method 500 determines if a safe grouping is found for all nodes. If a safe grouping is found for all nodes, the method proceeds to step 587 to output the safe groups (groupings). If a safe grouping is not found for all nodes, the method proceeds to step 589 to provide an indication that a safe grouping is not found. The method then proceeds to step 595 to end the processing nodes for placement in a safe group.

Note that eventually, either a safe grouping is found for all nodes, or the algorithm terminates once the maximum group size is reached. For the example above, if the process finds a safe grouping for all nodes, each of the groups may be of size k, k+1, or k+2. If the algorithm terminates without finding a safe group for every node, the user or data owner may rerun the algorithm by selecting a different ordering of the nodes or a smaller value of k. For example, if k is too large, the algorithm may terminate before it finds a safe group for each node. Therefore, the algorithm may have to be rerun with a smaller value of k. As described earlier, if k=1, the groups are trivially safe.

Figure 6:
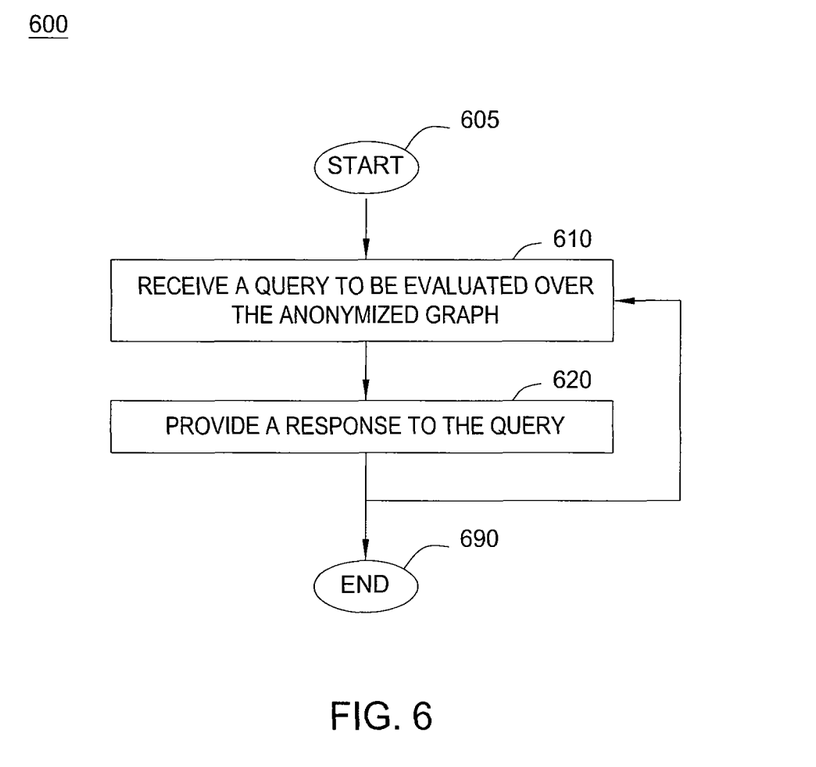
FIG. 6 illustrates a flowchart of a method for answering queries using anonymized data.

FIG. 6 illustrates a flowchart of a method 600 for answering queries using anonymized data. Method 600 starts in step 605 and proceeds to step 610.

In step 610, method 600 receives a query to be evaluated over the anonymized graph. For example, a user interested in performing a research may issue a query.

In step 620, method 600 provides a response to the query. For example, the method may evaluate the query over the anonymized graph and generate a response. The method then ends in step 690. Alternatively, the method may proceed to step 610 to receive another query.

It should be noted that although not specifically specified, one or more steps of methods 400, 500 or 600 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 4, FIG. 5 or FIG. 6 that recite a determining operation or involve a decision, do not necessarily require that both branches of the determining operation be practiced. In other words, one of the branches of the determining operation can be deemed as an optional step.

Figure 7:
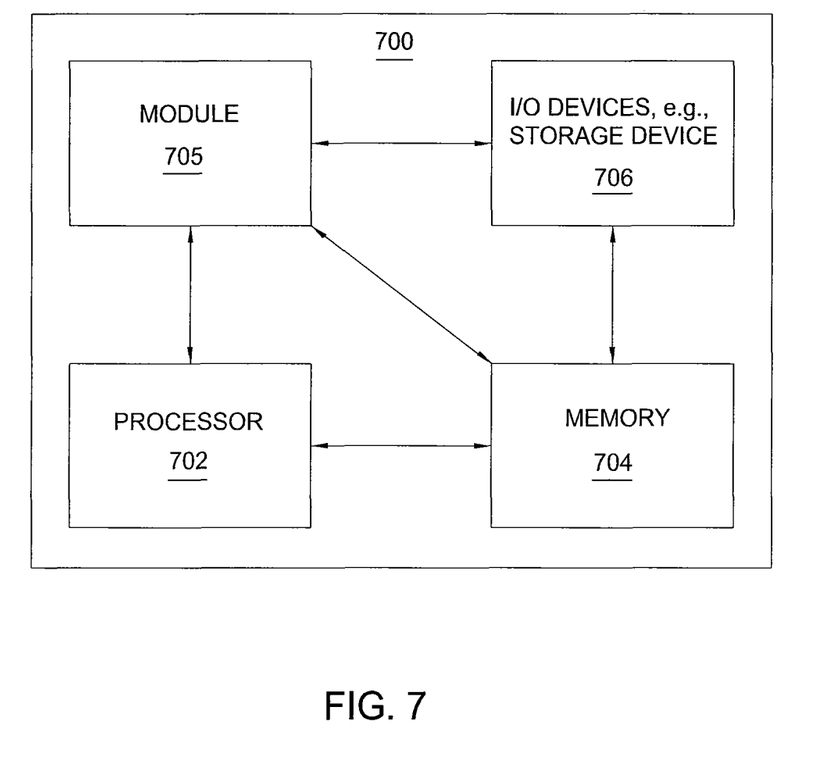
FIG. 7 illustrates a high-level block diagram of a general-purpose computer suitable for use in performing the functions described herein.

FIG. 7 depicts a high-level block diagram of a general-purpose computer suitable for use in performing the functions described herein. As depicted in FIG. 7, the system 700 comprises a processor or processing element 702 (e.g., a CPU), a memory 704, e.g., random access memory (RAM) and/or read only memory (ROM), a module 705 for providing anonymization of data, and various input/output devices 706 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 705 for providing anonymization of data can be loaded into memory 704 and executed by processor 702 to implement the functions as discussed above. As such, the present method 705 for providing anonymization of data (including associated data structures) of the present invention can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an anonymization of data, comprising:

receiving, by a processor, a request for anonymizing, wherein the request comprises a bipartite graph for a plurality of associations between a plurality of nodes of a first type and a plurality of nodes of a second type, wherein each association of the plurality of associations comprises a correlation between one of the plurality of nodes of the first type and one of the plurality of nodes of the first type;

placing, by the processor, each node of the first type of the bipartite graph in a safe group, wherein the placing comprises:

selecting a node of the first type for placing in a safe group, wherein the safe group is a group that has no other node of the first type that has an association with a particular node of the plurality of nodes of the second type, wherein the node of the first type that is selected has an association with the particular node of the plurality of nodes of the second type; and starting a new group that contains the node that is selected, when attempts have been made to place the node that is selected in each group of a partial grouping, and placing the node in any one of each group of the partial grouping would make any one of each group of the partial grouping in which the node is placed unsafe;

incrementing, by the processor, a value of a group size by one and repeating the placing each node of the first type in the safe group, when a maximum group size has not been reached and when there is a group with fewer nodes than the value of the group size; and providing, by the processor, an anonymized graph that encodes the plurality of associations of the bipartite graph, when a safe group for all nodes of the first type of the bipartite graph is found.

2. The method of claim 1, further comprising:
providing an indication that a safe group is not found, when a safe group is not found for the all nodes of the first type of the bipartite graph.

3. The method of claim 1, further comprising:
providing an indication that a safe grouping is not found, when the maximum group size has been reached and a safe group is not found for the all nodes of the first type; and
outputting a plurality of safe groups, when the maximum group size has been reached and a safe group is found for all nodes of the first type.

4. The method of claim 1, wherein the request further comprises at least one of: a value for a parameter of a group size, and a limit for a group size.

5. The method of claim 1, further comprising:
receiving a query to be evaluated over the anonymized graph; and
providing a response to the query.

6. The method of claim 1, wherein the data comprises personal information pertaining to a plurality of users.

7. A non-transitory computer-readable storage medium storing a plurality of instructions which, when executed by a processor, cause the processor to perform operations for providing an anonymization of data, the operations comprising:
receiving a request for anonymizing, wherein the request comprises a bipartite graph for a plurality of associations between a plurality of nodes of a first type and a plurality of nodes of a second type, wherein each association of the plurality of associations comprises a correlation between one of the plurality of nodes of the first type and one of the plurality of nodes of the first type;
placing each node of the first type of the bipartite graph in a safe group, wherein the placing comprises:
selecting a node of the first type for placing in a safe group, wherein the safe group is a group that has no other node of the first type that has an association with a particular node of the plurality of nodes of the second type, wherein the node of the first type that is selected has an association with the particular node of the plurality of nodes of the second type; and
starting a new group that contains the node that is selected, when attempts have been made to place the node that is selected in each group of a partial grouping, and placing the node in any one of each group of the partial grouping would make any one of each group of the partial grouping in which the node is placed unsafe;
incrementing, by the processor, a value of a group size by one and repeating the placing each node of the first type in the safe group, when a maximum group size has not been reached and when there is a group with fewer nodes than the value of the group size; and
providing an anonymized graph that encodes the plurality of associations of the bipartite graph, when a safe group for all nodes of the first type of the bipartite graph is found.

8. The non-transitory computer-readable storage medium of claim 7, further comprising:
providing an indication that a safe group is not found, when a safe group is not found for the all nodes of the first type of the bipartite graph.

9. The non-transitory computer-readable storage medium of claim 7, further comprising:
providing an indication that a safe grouping is not found, when the maximum group size has been reached and a safe group is not found for the all nodes of the first type; and
outputting a plurality of safe groups, when the maximum group size has been reached and a safe group is found for all nodes of the first type.

10. The non-transitory computer-readable storage medium of claim 7, wherein the request further comprises at least one of: a value for a parameter of a group size, and a limit for a group size.

11. The non-transitory computer-readable storage medium of claim 7, wherein the data comprises personal information pertaining to a plurality of users.

12. The non-transitory computer-readable storage medium of claim 7, further comprising:
receiving a query to be evaluated over the anonymized graph; and
providing a response to the query.

13. An apparatus for providing an anonymization of data, comprising:
a processor; and
a computer readable medium storing a plurality of instructions which, when executed by the processor, cause the processor to perform operations, the operations comprising:
receiving a request for anonymizing, wherein the request comprises a bipartite graph for a plurality of associations between a plurality of nodes of a first type and a plurality of nodes of a second type, wherein each association of the plurality of associations comprises a correlation between one of the plurality of nodes of the first type and one of the plurality of nodes of the first type;
placing each node of the first type of the bipartite graph in a safe group, wherein the placing comprises:
selecting a node of the first type for placing in a safe group, wherein the safe group is a group that has no other node of the first type that has an association with a particular node of the plurality of nodes of the second type, wherein the node of the first type that is selected has an association with the particular node of the plurality of nodes of the second type; and starting a new group that contains the node that is selected alone, when attempts have been made to place the node that is selected in each group of a partial grouping, and placing the node in any one of each group of the partial grouping would make any one of each group of the partial grouping in which the node is placed unsafe;

incrementing, by the processor, a value of a group size by one and repeating the placing each node of the first type in the safe group, when a maximum group size has not been reached and when there is a group with fewer nodes than the value of the group size; and providing an anonymized graph that encodes the plurality of associations of the bipartite graph, when a safe group for all nodes of the first type of the bipartite graph is found.

14. The apparatus of claim 13, further comprising:
providing an indication that a safe group is not found, when a safe group is not found for the all nodes of the first type of the bipartite graph.

15. The apparatus of claim 13, further comprising:
providing an indication that a safe grouping is not found, when the maximum group size has been reached and a safe group is not found for the all nodes of the first type; and outputting a plurality of safe groups, when the maximum group size has been reached and a safe group is found for all nodes of the first type.

16. The apparatus of claim 13, wherein the request further comprises at least one of: a value for a parameter of a group size, and a limit for a group size.

17. The apparatus of claim 13, further comprising:
receiving a query to be evaluated over the anonymized graph; and
providing a response to the query.

* * * * *